(12) United States Patent
Takahashi et al.

(10) Patent No.: US 11,789,596 B1
(45) Date of Patent: Oct. 17, 2023

(54) INSTRUMENT MANIPULATION SYSTEM AND MANIPULATION TERMINAL

(71) Applicant: TOYOTA JIDOSHA KABUSHIKI KAISHA, Toyota (JP)

(72) Inventors: Tetsuya Takahashi, Toyota (JP); Norihito Sawa, Shinjuku-ku (JP); Kohei Yamasaki, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/297,058

(22) Filed: Apr. 7, 2023

(30) Foreign Application Priority Data

May 31, 2022 (JP) ................................ 2022-089016

(51) Int. Cl.
　　*G06F 3/0484* (2022.01)
　　*H05B 47/175* (2020.01)
　　*G06F 3/14* (2006.01)
　　*G06F 3/0488* (2022.01)

(52) U.S. Cl.
CPC .......... *G06F 3/0484* (2013.01); *G06F 3/0488* (2013.01); *G06F 3/1415* (2013.01); *H05B 47/175* (2020.01)

(58) Field of Classification Search
CPC .... G06F 3/0484; G06F 3/0488; G06F 3/1415; G06F 3/048; G06F 3/0481; H05B 47/175; H05B 45/10; G05B 15/02
See application file for complete search history.

(56) References Cited

U.S. PATENT DOCUMENTS

| | | | | |
|---|---|---|---|---|
| RE48,882 E | * | 1/2022 | Ho | ........................ H05B 45/10 |
| 2015/0319821 A1 | * | 11/2015 | Yoshida | .............. G06F 3/04883 700/19 |
| 2017/0231066 A1 | * | 8/2017 | Roberts | .................... F21S 9/028 |
| 2022/0110196 A1 | * | 4/2022 | Heng | .................... H05B 45/20 |

FOREIGN PATENT DOCUMENTS

| | | |
|---|---|---|
| JP | 2019-50055 A | 3/2019 |
| WO | WO 2014/088081 A1 | 6/2014 |

* cited by examiner

*Primary Examiner* — Mong-Shune Chung
(74) *Attorney, Agent, or Firm* — Oblon, McClelland, Maier & Neustadt, L.L.P.

(57) ABSTRACT

An instrument manipulation system includes instruments disposed in a predetermined area, and a first manipulation terminal including: a first display unit that displays at least one of disposition positions of the instruments and a range covered by functions of the instruments; a first designation range input unit that receives an input of a designation range for designating at least one target instrument to be manipulated; a first identification information input unit that receives an input of identification information set in the designation range; and a first instrument control unit that causes the target instrument to perform a predetermined operation.

9 Claims, 13 Drawing Sheets

INSTRUMENT MANIPULATION SYSTEM AND MANIPULATION TERMINAL

CROSS-REFERENCE TO RELATED APPLICATION

This application claims priority to Japanese Patent Application No. 2022-089016 filed on May 31, 2022, incorporated herein by reference in its entirety.

BACKGROUND

1. Technical Field

The present disclosure relates to an instrument manipulation system and a manipulation terminal.

2. Description of Related Art

There is known a control system configured such that a predetermined section in which a plurality of lighting instruments is disposed is displayed on a touch panel and a range of lighting instruments to perform an operation such as a lighting-up operation is designated through an input action such as tracing on the touch panel (for example, Japanese Unexamined Patent Application Publication No. 2019-050055 (JP 2019-050055 A)).

SUMMARY

The above system does not sufficiently consider a case where a predetermined range is designated to operate the instruments in the designated range and then the instruments in the same range are caused to perform another operation. Therefore, there is a demand for improvement in convenience of an instrument manipulation system that manipulates the instruments.

The present disclosure can be realized in the following aspects.

(1) According to one aspect of the present disclosure, an instrument manipulation system includes instruments disposed in a predetermined area, and a first manipulation terminal. The first manipulation terminal includes: a first display unit configured to display, in association with the predetermined area, at least one of disposition positions of the instruments in the predetermined area and a range covered by functions of the instruments; a first designation range input unit configured to receive an input of a designation range for designating at least one target instrument to be manipulated among the instruments within a range associated with the predetermined area; a first identification information input unit configured to receive an input of identification information set in the designation range; a first designation range storage unit configured to store the designation range and the identification information in association with each other; and a first instrument control unit configured to cause the target instrument associated with the designation range associated with the input identification information to perform a predetermined operation.

According to the instrument manipulation system of this aspect, the predetermined operation can be performed by selecting the instruments in the same designation range by the simple manipulation using the identification information. The convenience of the instrument manipulation system can be improved.

(2) In the instrument manipulation system of the aspect described above, the first instrument control unit may be configured to, when the target instrument associated with the designation range associated with the input identification information is to be caused to perform the operation and a different identification information operating instrument that has performed a different operation from the operation by using different identification information from the input identification information is included, cause the target instrument excluding the different identification information operating instrument to perform the operation.

According to the instrument manipulation system of this aspect, it is possible to reduce the occurrence of a case where the user of the target instrument turns OFF the different identification information operating instrument that has performed the operation by another user or the like.

(3) The instrument manipulation system of the aspect described above may further include a second manipulation terminal that includes: a second display unit configured to display, in association with the predetermined area, at least one of the disposition positions of the instruments in the predetermined area and the range covered by the functions of the instruments; a second designation range input unit configured to receive an input of the designation range; a second identification information input unit configured to receive an input of the identification information; a second designation range storage unit configured to store the designation range and the identification information in association with each other; and a second instrument control unit configured to cause the target instrument associated with the designation range associated with the input identification information to perform at least one predetermined operation.

According to the instrument manipulation system of this aspect, the plurality of manipulation terminals that is the first manipulation terminal and the second manipulation terminal is provided. Thus, it is possible to reduce the occurrence of a case where the instruments cannot be manipulated when one manipulation terminal malfunctions, fails in communication, or the like.

(4) In the instrument manipulation system of the aspect described above, the second manipulation terminal may further include a second instrument manipulation history storage unit configured to store a manipulation history of the instruments manipulated by a manipulation terminal. The first manipulation terminal may further include: a first instrument manipulation history storage unit configured to store the manipulation history for the manipulation terminal; and a first terminal synchronization unit configured to acquire the manipulation history stored in the second manipulation terminal and synchronize the acquired manipulation history with the manipulation history stored in the first instrument manipulation history storage unit.

According to the instrument manipulation system of this aspect, the manipulation histories of the manipulation terminals can be maintained in the latest state.

(5) The instrument manipulation system of the aspect described above may further include: a first instrument control device including a first range history storage unit configured to store a manipulation history of at least one instrument included in a predetermined first range among the instruments; and a second instrument control device different from the first instrument control device and including a second range history storage unit configured to store a manipulation history of at least one instrument included in a predetermined second range different from the first range among the instruments. According to the instrument manipulation system of this aspect, it is possible to hedge the risk due to malfunction of the instrument control device and communication failure compared with a case where the manipulation history of all the instruments is stored in one instrument control device.

(6) The instrument manipulation system of the aspect described above may further include an auxiliary manipulation terminal configured to cause, among the instruments, at least one target instrument associated with an auxiliary designation range for designating the target instrument to perform the operation. The auxiliary designation range may not be changed by the auxiliary manipulation terminal. The auxiliary manipulation terminal may be configured to, when the target instrument associated with the auxiliary designation range is to be caused to perform the operation and an operation-completed instrument that has already performed a different operation from the operation by using a different manipulation terminal from the auxiliary manipulation terminal is included, cause the target instrument including the operation-completed instrument to perform the operation.

According to the instrument manipulation system of this aspect, the instrument associated with the auxiliary designation range can be caused to perform the operation by using the auxiliary manipulation terminal having the simple configuration.

(7) In the instrument manipulation system of the aspect described above, the first instrument control unit may be configured to, after a predetermined period has elapsed since the auxiliary manipulation terminal caused the target instrument including the operation-completed instrument to perform the operation, return the operation-completed instrument that has performed the operation to a state before the operation is performed.

According to the instrument manipulation system of this aspect, it is possible to reduce the occurrence of a case where the operation of the operation-completed instrument is completed by the user of the auxiliary manipulation terminal regardless of the intention of the user who has caused the operation-completed instrument to perform the operation.

(8) In the instrument manipulation system of the aspect described above, the first instrument control unit may be configured to, when a series of the operations of the target instrument associated with the designation range associated with the stored identification information is completed, delete the designation range and the identification information stored in the first designation range storage unit.

According to the instrument manipulation system of this aspect, a first storage device can be simplified.

(9) According to another aspect of the present disclosure, a terminal device includes: a display unit configured to display, in association with a predetermined area, at least one of disposition positions of instruments disposed in the predetermined area and a range covered by functions of the instruments; a designation range input unit configured to receive an input of a designation range for designating a target instrument to be manipulated among the instruments within a range associated with the predetermined area; an identification information input unit configured to receive an input of identification information set in the designation range; a designation range storage unit configured to store the designation range and the identification information in association with each other; and an instrument control unit configured to cause the target instrument associated with the designation range associated with the input identification information to perform at least one predetermined operation.

According to the terminal device of this aspect, the predetermined operation can be performed by selecting the instruments in the same designation range by the simple manipulation using the identification information. Thus, the convenience of the instrument manipulation system can be improved.

The present disclosure may also be realized in various forms other than the instrument manipulation system and the terminal device. For example, the present disclosure may be realized in the form of an instrument, a method for controlling the instrument, a method for controlling an instrument manipulation system, a method for controlling a terminal device, a computer program that realizes the control methods, or a non-transitory recording medium that records the computer program.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS (A) First Embodiment

Figure 1:
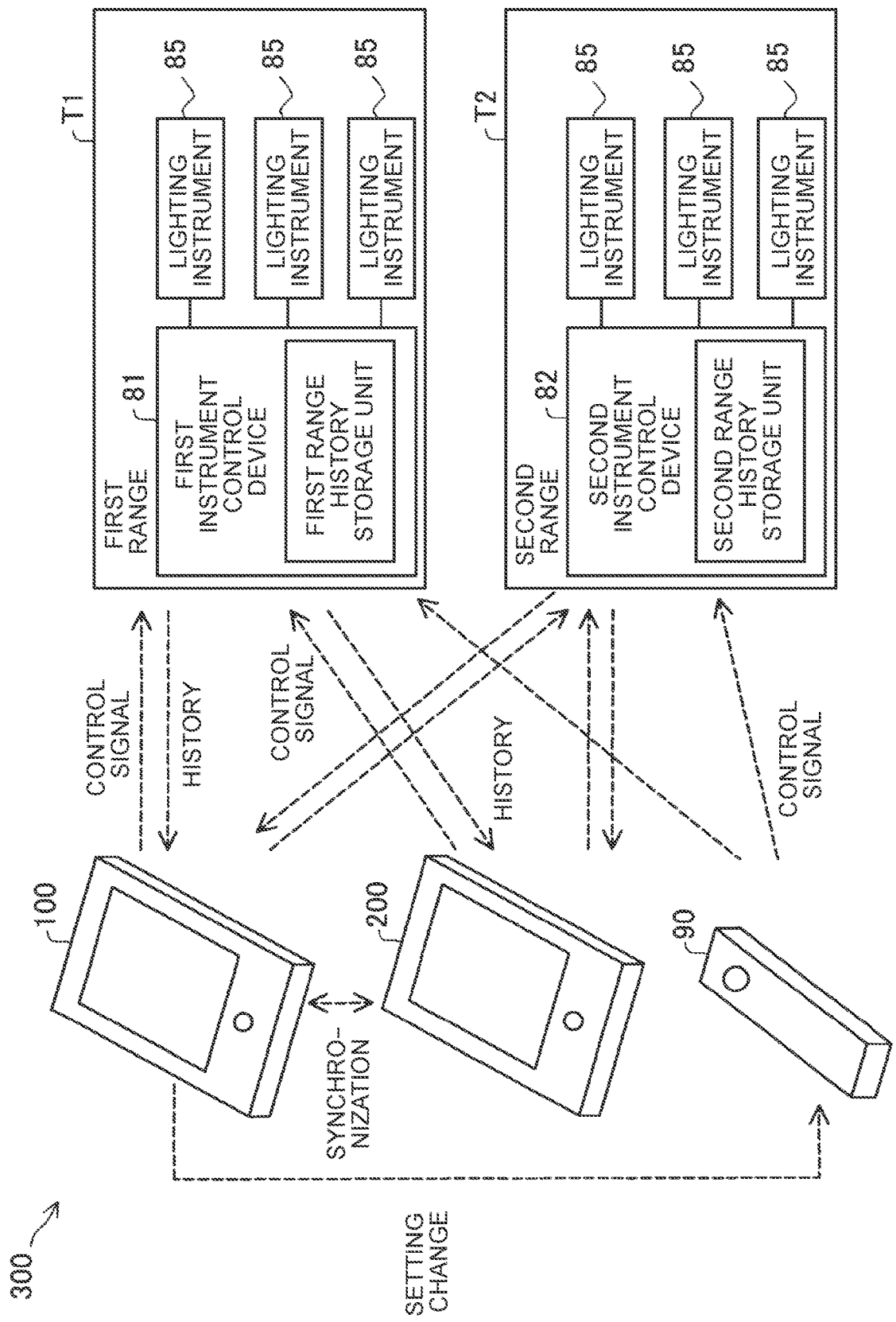
FIG. 1 is an explanatory diagram showing the configuration of an instrument manipulation system according to a first embodiment of the present disclosure.

FIG. 1 is an explanatory diagram showing the configuration of an instrument manipulation system 300 according to a first embodiment of the present disclosure. The instrument manipulation system 300 includes a first manipulation terminal 100 and a plurality of lighting instruments 85. In the present embodiment, the instrument manipulation system 300 further includes a second manipulation terminal 200 similar to the first manipulation terminal 100, and an auxiliary manipulation terminal 90 simpler than the first manipulation terminal 100. In the present disclosure, the first manipulation terminal 100, the second manipulation terminal 200, and the auxiliary manipulation terminal 90 are also referred to as "manipulation terminals" when not distinguished. The manipulation terminals and the lighting instruments 85 are connected to communicate with each other via wireless or wired communication lines (not shown). The instrument manipulation system 300 causes the lighting instruments 85 to perform predetermined operations by manipulation on the manipulation terminal. In the present embodiment, the predetermined operations to be performed by the lighting instrument 85 are operations of turning ON (lighting-up) and turning OFF (extinguishing) the lighting instrument 85. When the first manipulation terminal 100 and the second manipulation terminal 200 are not distinguished, they are also referred to as "main manipulation terminals".

The main manipulation terminal is a portable information terminal (client), and includes, for example, a smart phone, a mobile phone, a personal handyphone system (PHS), a slate terminal, and a tablet terminal. A smart device such as a notebook personal computer (PC), a tablet PC, or a portable game machine may also be applied to the main manipulation terminal. The auxiliary manipulation terminal 90 is capable of one-way communication and can only control the execution of the predetermined operations on the lighting instrument 85.

The lighting instruments 85 are, for example, light-emitting diode (LED) lights, and are arranged in a predetermined area in a factory or the like. The "predetermined area" means, for example, one factory, one building, one floor of a building, one or more rooms in a building, or one or more sections in one floor or one room.

In the present embodiment, the lighting instruments 85 are connected to a first instrument control device 81 and a second instrument control device 82. The first instrument control device 81 and the second instrument control device 82 control the lighting instruments 85 for each predetermined range in the factory. The first instrument control device 81 and the second instrument control device 82 each include a distribution board (not shown) including control relays, breakers, and the like, and can individually turn ON or OFF the lighting instruments 85. The first instrument control device 81 and the second instrument control device 82 each include a communication device (not shown) for communicating with the main manipulation terminals. The range of the lighting instruments 85 to be controlled by the first instrument control device 81 is also referred to as "first range T1". The range of the lighting instruments 85 to be controlled by the second instrument control device 82 is also referred to as "second range T2". The first instrument control device 81 and the second instrument control device 82 are also referred to as "instrument control devices" when not distinguished. In the example of FIG. 1, the two control devices that are the first instrument control device 81 and the second instrument control device 82 are provided for convenience of the description, but the number of instrument control devices may be one or any number such as three or more.

Each of the first instrument control device 81 and the second instrument control device 82 is a microcomputer including a central processing unit (CPU) and memories such as a read-only memory (ROM) and a random-access memory (RAM). The first instrument control device 81 stores a manipulation history of the lighting instruments 85 in the first range T1. The second instrument control device 82 stores a manipulation history of the lighting instruments 85 in the second range T2. Each of the first instrument control device 81 and the second instrument control device 82 stores, as the manipulation history of the lighting instruments 85, a history of operations performed by the lighting instruments 85, including operations of turning ON and OFF the lighting instruments 85, in association with the manipulation terminal that has executed the operations. In the present embodiment, for simplification of the first instrument control device 81 and the second instrument control device 82, a history of the operation that is executed last and the manipulation terminal that has executed the operation are stored as the manipulation history of the lighting instruments 85. For example, the first instrument control device 81 and the second instrument control device 82 feed, back to the main manipulation terminals, results of control on the operations of turning ON and OFF the lighting instruments 85 and information related to the manipulation history as to which manipulation terminal has executed the control. The main manipulation terminal can acquire, from the instrument control device, a manipulation result of the auxiliary manipulation terminal 90 that does not communicate with the main manipulation terminal as described later.

Figure 2:
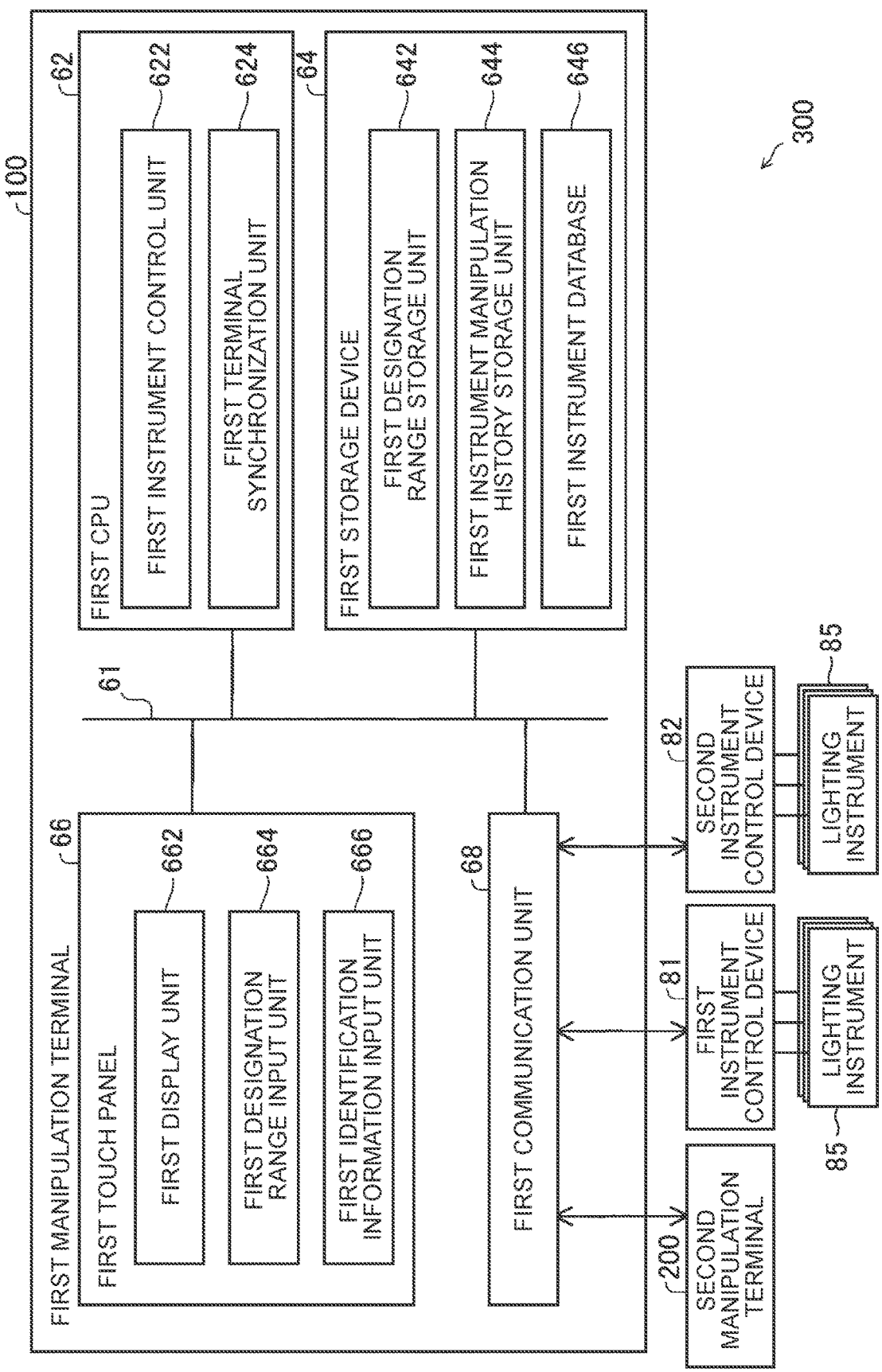
FIG. 2 is a block diagram showing the functional configuration of a first manipulation terminal.

FIG. 2 is a block diagram showing the functional configuration of the first manipulation terminal 100. In the present embodiment, the user of the first manipulation terminal 100 is assumed to be a person who is unfamiliar with the factory, such as a guest or a maintenance engineer who visits the factory from the outside. The first manipulation terminal 100 includes a first central processing unit (CPU) 62, a first storage device 64, a first touch panel 66, and a first communication unit 68. These components are connected to communicate with each other via an internal bus 61.

The first storage device 64 is, for example, a RAM, a ROM, or a hard disk drive (HDD). The HDD or ROM stores various programs for implementing functions provided in the present embodiment. The various programs read from the HDD or ROM are loaded on the RAM and executed by the first CPU 62. The first storage device 64 includes a first designation range storage unit 642, a first instrument manipulation history storage unit 644, and a first instrument database 646 in its readable and writable area.

The first designation range storage unit 642 stores a designation range and identification information in association with each other as setting information. The first instrument manipulation history storage unit 644 stores a manipulation history of the lighting instruments 85 manipulated by the manipulation terminal. The first instrument database 646 prestores various types of information related to the lighting instruments 85 that is necessary for implementing the functions provided in the present embodiment, such as installation positions of the lighting instruments 85 in the factory and light radiation areas of the lighting instruments 85.

The first touch panel 66 includes a first display unit 662, a first designation range input unit 664, and a first identification information input unit 666. The first display unit 662 is a liquid crystal display, an organic electroluminescence (EL) display, or the like that can display information such as images and texts. The first display unit 662 includes a touch sensor that detects a user's action by using, for example, a change in capacitance, a change in ultrasonic wave, a change in infrared ray, a change in pressure, or a change in electrical resistance. The touch sensor may detect an actual touch action on the first display unit 662, or may detect a non-touch action.

In the present embodiment, the first display unit 662 can display a map of the factory where the lighting instruments 85 are arranged, and a range covered by the functions of the lighting instruments 85. The "range covered by the functions of the lighting instruments 85" means a range in which the functions are exerted by the operations performed by the instruments. In the present embodiment, the range is a light radiation area of the lighting instruments 85. The first display unit 662 can display the radiation area in association with the map of the factory. The first display unit 662 may display the disposition positions of the lighting instruments 85 in the factory instead of or together with the range covered by the functions of the lighting instruments 85.

The "map" is, for example, a plan view showing the predetermined area. The map may include display information indicating a positional relationship in the area. The "display information indicating the positional relationship" means, for example, symbols representing building components such as walls, pillars, doors, windows, stairs, elevators, and escalators, equipment such as desks and partitions, and directions, and text information indicating names of places, department names, and individual names. Examples of the names of places include names of steps in a manufacturing process, names of production lines and instruments, rooms, and work areas. The predetermined area is not limited to an indoor area, and may be an outdoor area.

The first designation range input unit 664 receives an input of a designation range by the user. The "designation range" means a range for designating at least one lighting instrument 85 to be manipulated by the main manipulation terminal among the plurality of lighting instruments 85. The designation range may be a range associated with a predetermined area in a factory or the like. In the present embodiment, the designation range is an arbitrary range on the factory map. The first designation range input unit 664 uses the touch sensor of the first display unit 662, and receives the input of the designation range by detecting the user's action on a display screen of the first display unit 662. The user can input the designation range by performing an action on the screen while viewing the factory map displayed on the first display unit 662.

The first identification information input unit 666 receives an input of identification information. The "identification information" means various types of information that can distinguish one designation range from the other designation ranges. The identification information can be set for each designation range. In the present embodiment, a one-digit number is used for the identification information.

The first CPU 62 functions as a first instrument control unit 622 and a first terminal synchronization unit 624 by executing a control program prestored in the first storage device 64. The first terminal synchronization unit 624 maintains the latest state by synchronizing the manipulation history and the setting information including the identification information and the designation range that are stored in the other main manipulation terminal (second manipulation terminal 200 in the present embodiment), and the manipulation history and the setting information that are stored in the first instrument manipulation history storage unit.

The first instrument control unit 622 turns ON or OFF the lighting instruments 85 associated with the designation range. The "instruments associated with the designation range" include instruments arranged in the designation range and instruments arranged outside the designation range with their functions covering the designation range. With this configuration, it is possible to reduce the occurrence of, for example, a case where the designation range set by the user has a part that cannot sufficiently obtain the functions of the instruments because the instruments are not arranged in the designation range.

The first communication unit 68 is an interface that controls communication with the second manipulation terminal 200 and the instrument control devices. More specifically, the first communication unit 68 transmits control signals to the first instrument control device 81 and the second instrument control device 82 via communication lines on the Internet, a local area network, or the like, and receives the manipulation histories of the lighting instruments 85 from the first instrument control device 81 and the second instrument control device 82 via the communication lines. In the present embodiment, the first communication unit 68 further performs data transfer with the second manipulation terminal 200 for synchronization of the manipulation history or the like.

The functional configuration of the second manipulation terminal 200 is similar to that of the first manipulation terminal 100. Specifically, the second manipulation terminal 200 includes a second CPU similar to the first CPU 62, a second storage device similar to the first storage device 64, a second touch panel similar to the first touch panel 66, and a second communication unit similar to the first communication unit 68. The second CPU includes a second instrument control unit similar to the first instrument control unit 622, and a second terminal synchronization unit similar to the first terminal synchronization unit 624. The second storage device includes a second designation range storage unit similar to the first designation range storage unit 642, a second instrument manipulation history storage unit similar to the first instrument manipulation history storage unit 644, and a second instrument database similar to the first instrument database 646. The second touch panel includes a second display unit similar to the first display unit 662, a second designation range input unit similar to the first designation range input unit 664, and a second identification information input unit similar to the first identification information input unit 666. The user of the second manipulation terminal 200 is assumed to be a person who acts for purposes different from those of the user of the first manipulation terminal 100, such as a person who is familiar with the factory as typified by a manager of the entire factory or a person who works in a plurality of ranges in the factory.

Figure 3:
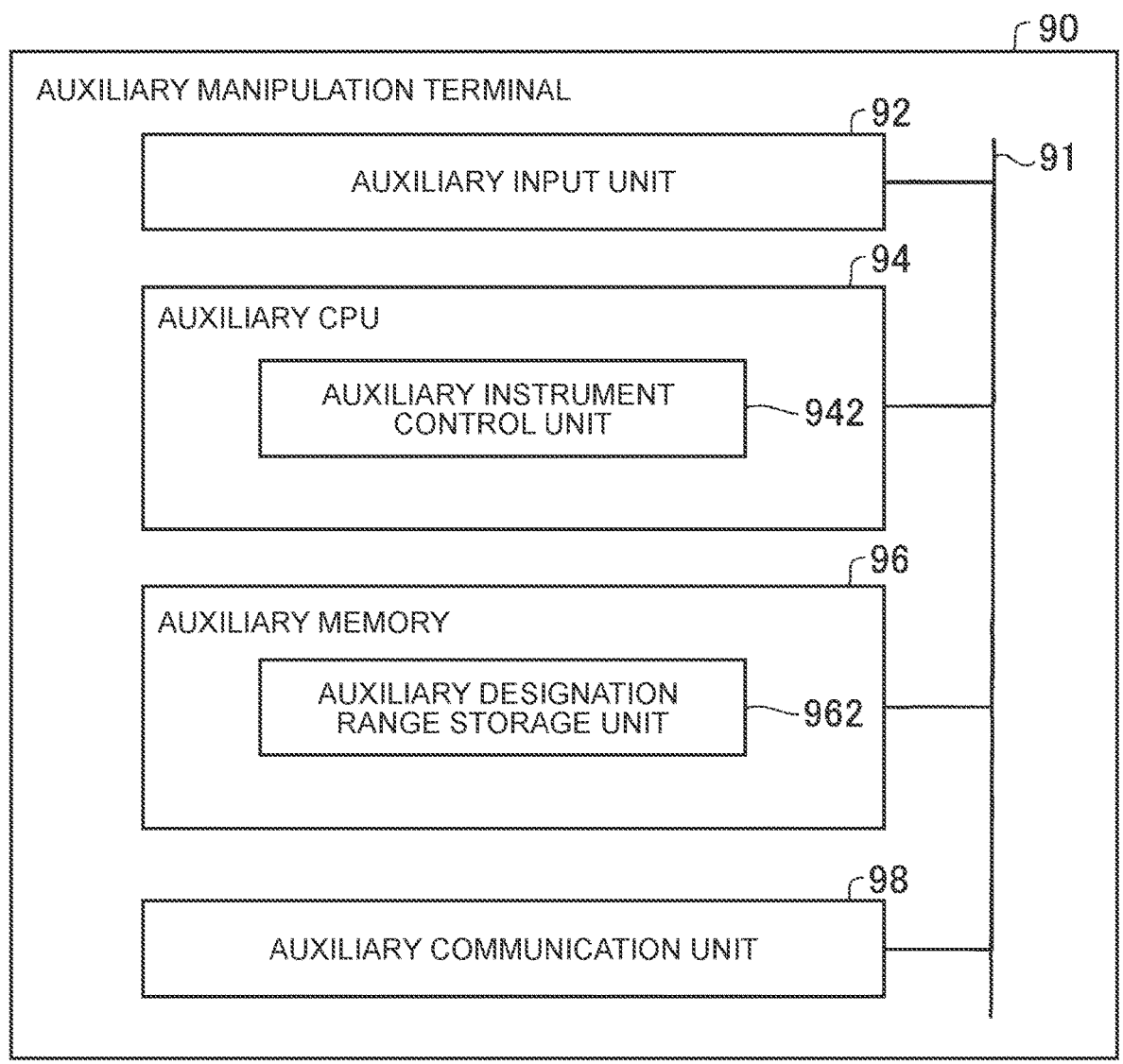
FIG. 3 is a block diagram showing the internal functional configuration of an auxiliary manipulation terminal.

FIG. 3 is a block diagram showing the internal functional configuration of the auxiliary manipulation terminal 90. The auxiliary manipulation terminal 90 is a so-called portable general-purpose remote controller, and causes lighting instruments 85 associated with a preset auxiliary designation range to perform the predetermined operations (ON or OFF of the lighting instruments 85 in the present embodiment). The "auxiliary designation range" means a range for designating at least one lighting instrument 85 to be manipulated by the auxiliary manipulation terminal 90 among the plurality of lighting instruments 85. The auxiliary designation range is a range associated with a predetermined area on the factory map or the like. The auxiliary designation range cannot be set or changed by using the auxiliary manipulation terminal 90, but can be set or changed by the main manipulation terminal in communication with the auxiliary manipulation terminal 90. The "instruments associated with the auxiliary designation range" are similar to the "instruments associated with the designation range", and therefore description thereof is omitted. The auxiliary manipulation terminal 90 is not limited to the portable general-purpose remote controller, and may be, for example, a panel fixed to a wall, a pillar, or the like in the factory.

The auxiliary manipulation terminal 90 includes an auxiliary input unit 92, an auxiliary central processing unit (CPU) 94, an auxiliary memory 96, and an auxiliary communication unit 98. These components are connected to communicate with each other via an internal bus 91. The auxiliary memory 96 is a RAM, a ROM, or the like, and includes an auxiliary designation range storage unit 962. The auxiliary designation range storage unit 962 stores the auxiliary designation range.

The auxiliary input unit 92 detects a user's action for depressing a manipulation switch. The auxiliary CPU 94 functions as an auxiliary instrument control unit 942 by executing a program stored in the memory. When the user's action on the auxiliary input unit 92 is detected, the auxiliary instrument control unit 942 generates a control signal for turning ON or OFF the lighting instruments 85 associated with the auxiliary designation range.

The auxiliary communication unit 98 is an interface that executes communication control for transmitting control signals to the first instrument control device 81 and the second instrument control device 82. Communication with the first instrument control device 81 and the second instrument control device 82 may be wired communication or wireless communication. The wireless communication can be realized by, for example, infrared communication, wireless connection via a wireless local network (LAN) conforming to the IEEE 802.11 standard, or wireless communication using Bluetooth (registered trademark). In the present embodiment, the auxiliary manipulation terminal 90 can communicate with the first manipulation terminal 100 via the auxiliary communication unit 98 or an input/output interface (not shown). Thus, the first manipulation terminal 100 can set the auxiliary designation range for the auxiliary manipulation terminal 90.

In the present embodiment, the user of the auxiliary manipulation terminal 90 is assumed to be a person who acts mainly in a predetermined range in the factory, such as a manager or worker of a predetermined manufacturing area in the factory. For example, it is assumed that a worker who works mainly in the auxiliary designation range manipulates the auxiliary manipulation terminal 90 to turn ON the lighting instruments 85 associated with the auxiliary designation range at a start time of work and to turn OFF the lighting instruments 85 at an end time of work.

Figure 4:
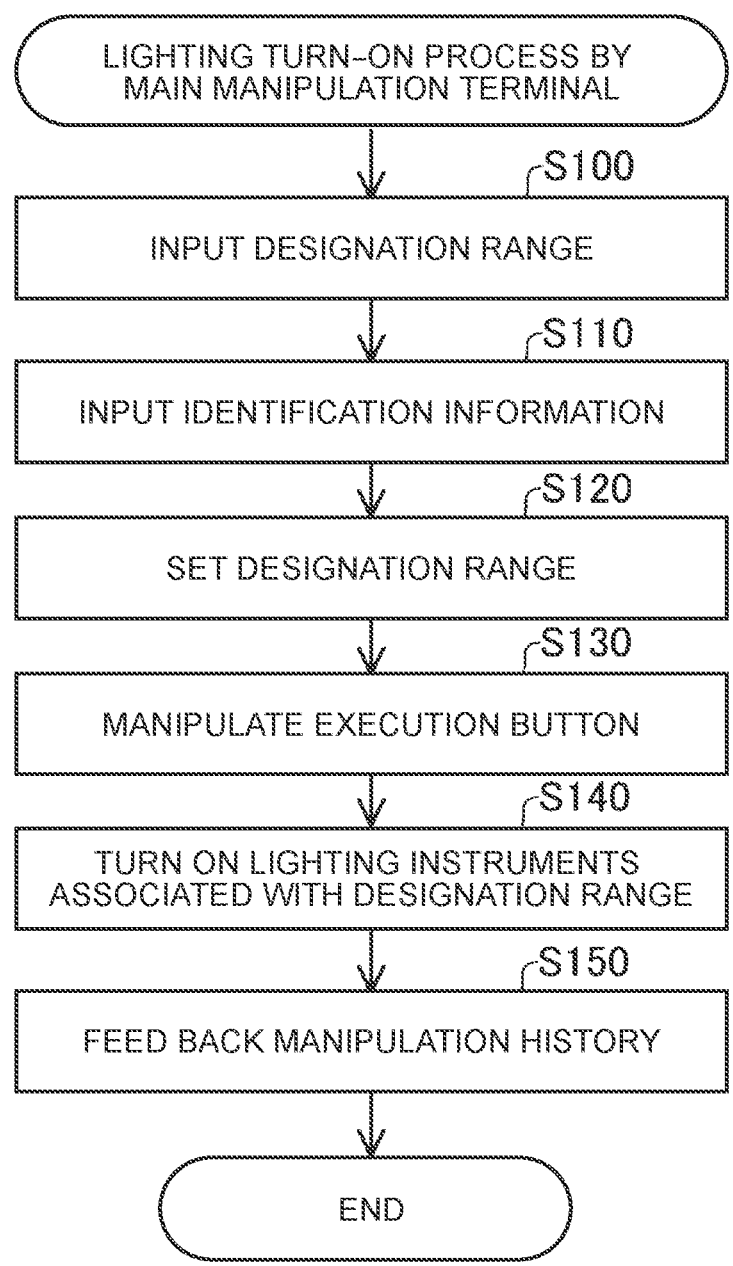
FIG. 4 is a flowchart showing a lighting turn-on process by a main manipulation terminal.

FIG. 4 is a flowchart showing a lighting turn-on process by the main manipulation terminal. This flow is started, for example, when the user of the main manipulation terminal activates an application program that controls the manipulation of the lighting instruments 85 and the main manipulation terminal receives a user's action for starting the lighting turn-on process. The following description will be given taking an example in which the first manipulation terminal 100 is used as the main manipulation terminal.

Figure 5:
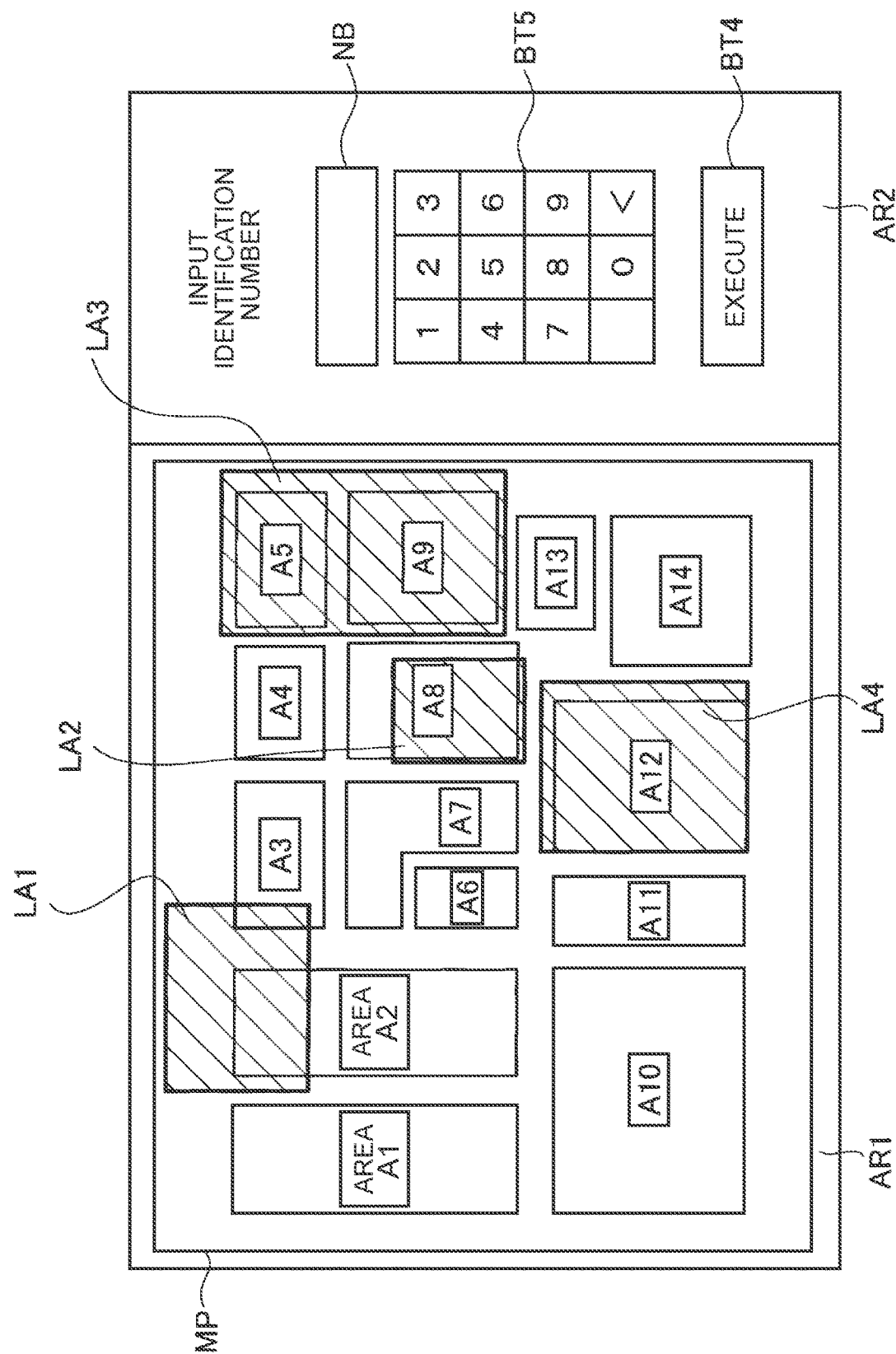
FIG. 5 is an explanatory diagram showing an example of a display screen of a first display unit at the start of the lighting turn-on process.

FIG. 5 is an explanatory diagram showing an example of a display screen of the first display unit 662 at the start of the lighting turn-on process. As shown in FIG. 5, the display screen of the first display unit 662 is divided into display areas AR1 and AR2.

A plan view MP showing the factory map is displayed in the display area AR1. The plan view MP shows areas A1 to A14 corresponding to steps and work areas in the factory. In the present embodiment, the disposition positions of the lighting instruments 85 are not displayed in the display area AR1. By performing actions on the display area AR1 of the first display unit 662, the user can, for example, enlarge or reduce the plan view MP and change the area in the factory to be displayed. The display area AR1 of the first display unit 662 is included in the first designation range input unit 664.

As shown in FIG. 5, radiation areas LA1 to LA4 of the lighting instruments 85 that have already been turned ON at the start of the lighting turn-on process are displayed in the display area AR1 in association with the plan view MP of the factory. The ON/OFF states of the lighting instruments 85 in the factory can be generated, for example, from the manipulation history stored in the first instrument manipulation history storage unit 644 by using information at the start of the lighting turn-on process. Thus, the user can easily check the lighting states of the lighting instruments 85 in the plan view MP. There is no limitation on whether to display the manipulation terminal that has executed the turn-on operation for the radiation areas LA1 to LA4.

An input screen for identification information is displayed in the display area AR2. An execution button BT4 and numeric buttons BT5 are arranged in the display area AR2. The numeric buttons BT5 are used to input an identification number. The execution button BT4 is used to cause the lighting instruments 85 associated with the designation range corresponding to the input identification number to perform a turn-on process or a turn-off process. In the present embodiment, the execution button BT4 also has a function of determining the input identification number. The numeric buttons BT5 and the execution button BT4 displayed in the display area AR2 are included in the first identification information input unit 666.

Returning to FIG. 4, the user inputs the designation range by performing an action on the first designation range input unit 664 in Step S100. In the present embodiment, the user can set the designation range by a tracing action on the display area AR1 of the first display unit 662 with a finger or the like. In the present embodiment, the first instrument control unit 622 determines that the lighting turn-on process is performed by receiving the action for inputting the designation range before the input of the identification number. With this configuration, it is possible to omit a lighting turn-on button for starting the lighting turn-on process and manipulation of this button, thereby simplifying the display contents of the first display unit 662 and the control of the first instrument control unit 622.

Figure 6:
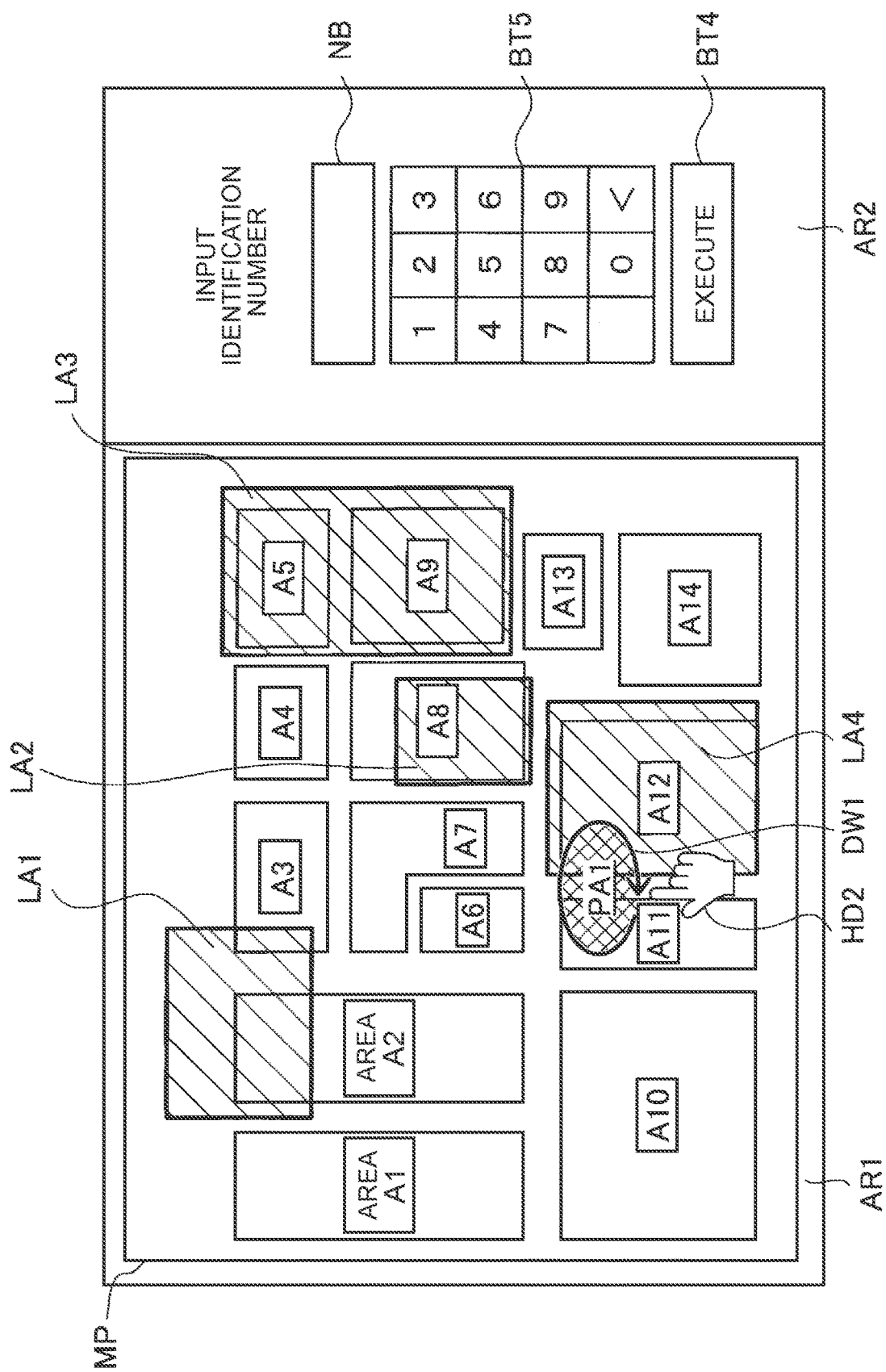
FIG. 6 is an explanatory diagram showing an example of a display screen of the first display unit when setting a designation range.

FIG. 6 is an explanatory diagram showing an example of a display screen of the first display unit 662 when setting the designation range. As shown in FIG. 6, the user starts the lighting turn-on process by the first manipulation terminal 100, for example, by performing an action on the display area AR1 of the first display unit 662 with a finger HD2 to set the designation range.

In the example of FIG. 6, a designation range PA1 is set, and a trail DW1 drawn by the user's finger HD2 to surround the designation range PA1 is shown. The trail DW1 need not be closed. The shape of the trail DW1 is not limited to a circular shape, and may be any shape such as a linear shape or a rectangular shape. In the case where the trail DW1 has a linear shape, the designation range may be a rectangular range having the trail DW1 as a diagonal line. The first designation range input unit 664 inputs the designation range PA1 by repeatedly acquiring coordinates of the trail DW1 in the plan view MP at regular time intervals and inputting a plurality of coordinates on the trail DW1. The first display unit 662 may display or hide the designation range PA1 and the trail DW1. The first display unit 662 may set the display color of the designation range PA1 and the trail DW1 to a display color different from the display color of the radiation areas LA1 to LA4 or the like. The first display unit 662 may periodically change the display color in a blinking fashion.

Figure 7:
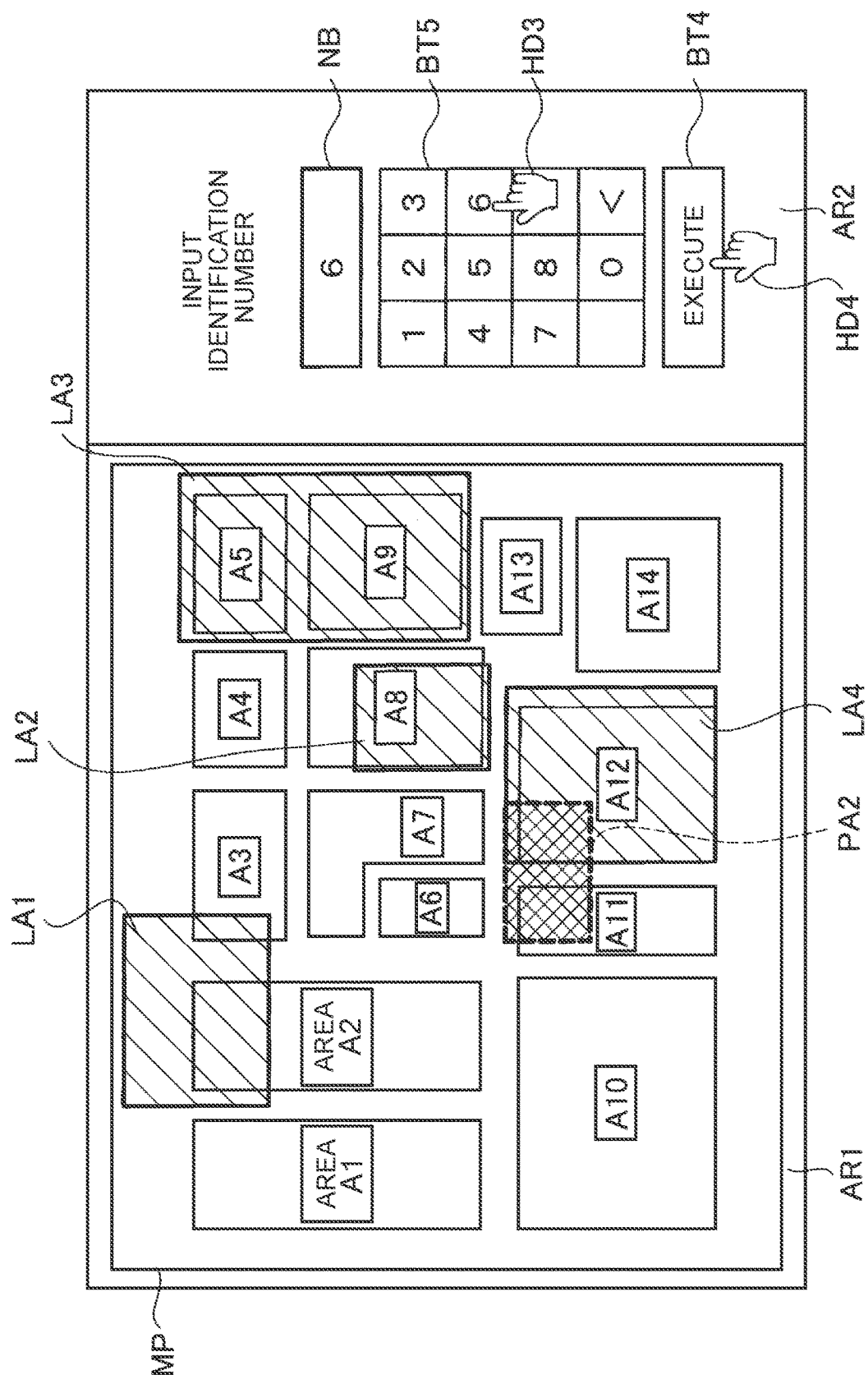
FIG. 7 is an explanatory diagram showing an example of a display screen of the first display unit when setting identification information.

Returning to FIG. 4, the user inputs the identification information by performing an action on the first identification information input unit 666 in Step S110. FIG. 7 is an explanatory diagram showing an example of a display screen of the first display unit 662 when setting the identification information. FIG. 7 shows a radiation area PA2 of the lighting instruments 85 associated with the designation range PA1 shown in FIG. 6. The radiation area PA2 is a radiation area in a case where the lighting instruments 85 necessary for obtaining sufficient illuminance in the entire designation range PA1 are turned ON. The radiation area PA2 can be generated by using the installation positions and the radiation areas of the lighting instruments 85 that are stored in the first instrument database 646. More specifically, the radiation area PA2 can be set by deriving the lighting instruments 85 necessary for covering the designation range PA1 with their radiation areas. In the present embodiment, the "lighting instruments 85 associated with the designation range PA1" mean the lighting instruments 85 necessary for irradiating the radiation area PA2. The first display unit 662 may set the display color of the radiation area PA2 to a display color different from the display color of the other radiation areas LA1 to LA4. The first display unit 662 may periodically change the display color in a blinking fashion. As shown in FIG. 7, a part of the radiation area PA2 overlaps the radiation area LA4.

In the examples of FIGS. 6 and 7, the radiation area PA2 is wider than the designation range PAL In the present embodiment, a setting is made to turn ON the lighting instruments 85 necessary for including the designation range PA1 in the radiation area, instead of the setting to turn ON the lighting instruments 85 arranged in the designation range PAL Thus, the user can set the range to be illuminated by the lighting instruments 85 as the designation range PAL Therefore, it is possible to reduce the occurrence of a case where sufficient illuminance cannot be obtained in the designation range PA1 because the lighting instruments 85 are not arranged in the designation range PA1. The following description will be given taking an example in which the lighting instruments 85 associated with the radiation area PA2 are the lighting instruments 85 included in the first range T1 shown in FIG. 1.

After confirming the radiation area PA2, the user inputs an arbitrary one-digit identification number ("6" in the example of FIG. 7) by manipulating the numeric button BT5 with a finger HD3 as shown in the display area AR2 in FIG. 7. The input identification number is displayed in an identification number display field NB.

Returning to FIG. 4, the user who has input the identification number determines the identification number in Step S120 by manipulating the execution button BT4 as indicated by a finger HD4 in FIG. 7, thereby storing the setting of the correspondence between the identification number and the designation range PA1 in the first designation range storage unit 642. The correspondence between the identification number and the radiation area PA2 may be set and stored. The manipulation of the execution button BT4 doubles as manipulation of the execution button BT4 in Step S130. The first instrument control unit 622 that has received the input on the execution button BT4 generates a control signal for turning ON the lighting instruments 85 associated with the radiation area PA2, and transmits the control signal to the first instrument control device 81. In another embodiment, the lighting instruments 85 associated with the radiation area PA2 may be turned ON, for example, by proceeding to Step S140 in response to reception of the manipulation of the numeric button BT5 in Step S110 (input of "6" in the example of FIG. 7). In this case, Step S130 and the execution button BT4 can be omitted.

In Step S140, the first instrument control device 81 that has acquired the control signal turns ON the lighting instruments 85 associated with the radiation area PA2. In Step S150, the first instrument control device 81 feeds, back to the main manipulation terminal, information for identifying the turned ON lighting instruments 85 and information on a manipulation history that the turn-on process has been executed by the first manipulation terminal 100 as a control result in association with, for example, a date and time. Then, the process is completed.

Figure 8:
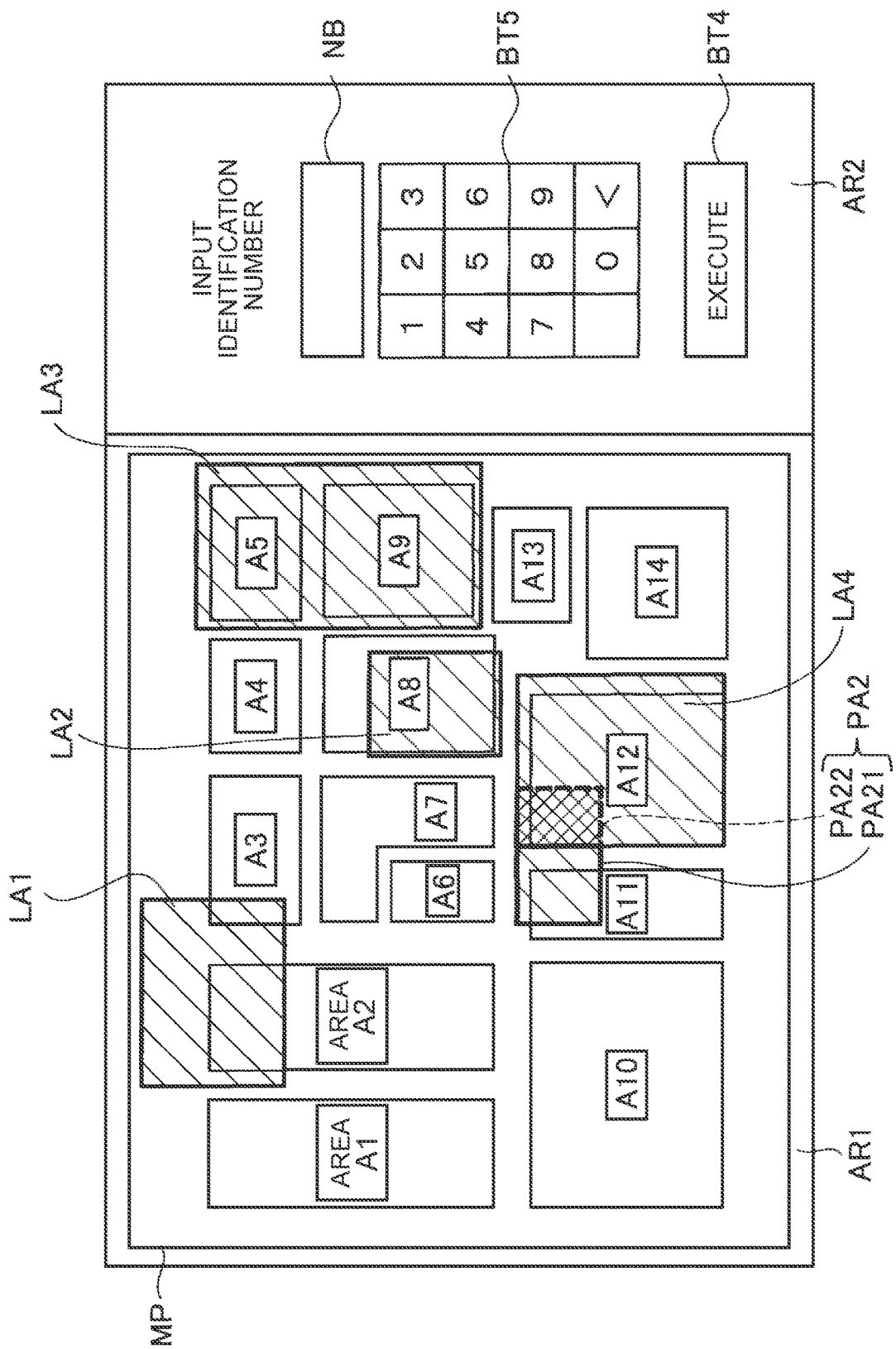
FIG. 8 is an explanatory diagram showing an example of a display screen of the first display unit at the completion of the lighting turn-on process.

FIG. 8 is an explanatory diagram showing an example of a display screen of the first display unit 662 at the completion of the lighting turn-on process. As shown in FIG. 8, the radiation area PA2 is illuminated as a result of the control described above. The radiation area PA2 includes a radiation area PA22 that overlaps the radiation area LA4, and a radiation area PA21 that does not overlap the radiation area LA4. The lighting instruments 85 that are ON in the radiation area PA22 are the same before and after the execution of the lighting turn-on process.

Figure 9:
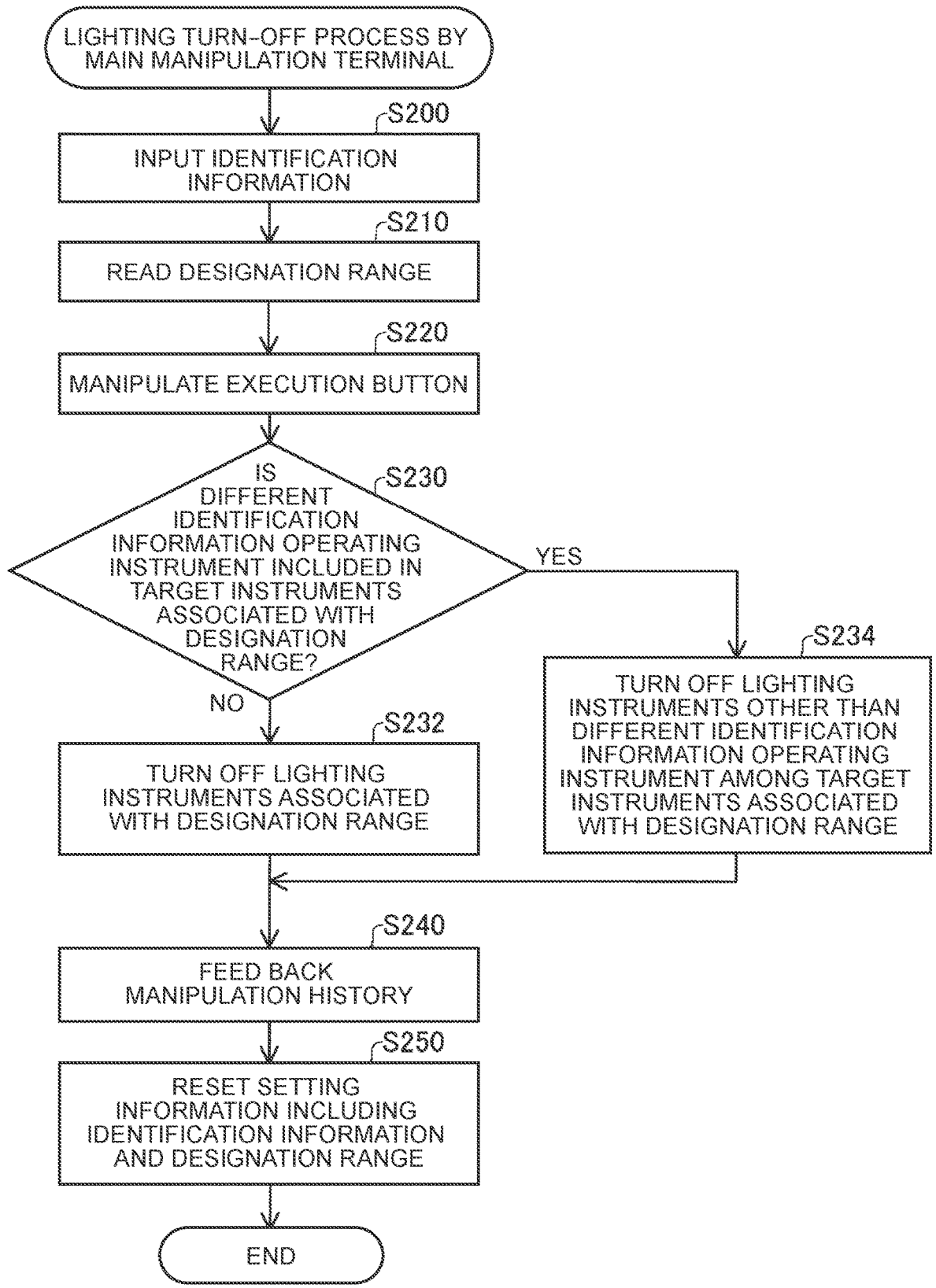
FIG. 9 is a flowchart showing a lighting turn-off process by the main manipulation terminal.

FIG. 9 is a flowchart showing a lighting turn-off process by the main manipulation terminal. This flow is started, for example, when the first manipulation terminal 100 receives a user's action for starting the lighting turn-off process. In Step S200, the user inputs identification information by performing an action on the first identification information input unit 666. In the present embodiment, the first instrument control unit 622 determines that the lighting turn-off process is performed by receiving the action for inputting the identification number before the input of the designation range. With this configuration, it is possible to omit a lighting turn-off button for starting the lighting turn-off process and manipulation of this button, thereby simplifying the display contents of the first display unit 662 and the control of the first instrument control unit 622. In Step S210, the first instrument control unit 622 that has received the input of the identification information reads the designation range PA1, more specifically, the radiation area PA2 associated with the input identification information, and displays it on the first display unit 662. In Step S220, the user manipulates the execution button BT4.

Figure 10:
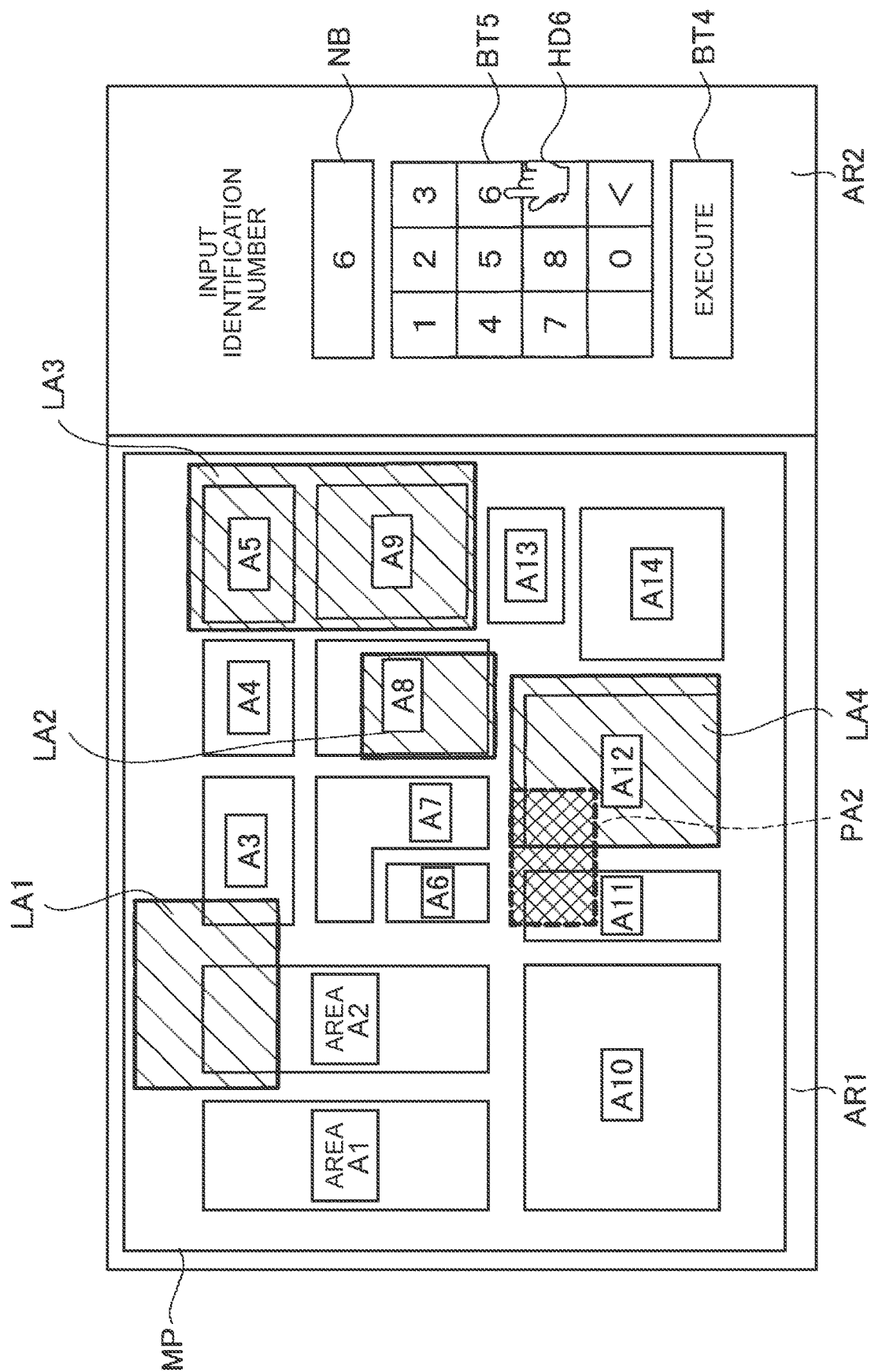
FIG. 10 is an explanatory diagram showing an example of a display screen of the first display unit during execution of the lighting turn-off process.

FIG. 10 is an explanatory diagram showing an example of a display screen of the first display unit 662 during execution of the lighting turn-off process. For example, the user starts the lighting turn-off process by the first manipulation terminal 100 by manipulating the numeric button BT5 in the display area AR2 with a finger HD6. In the present embodiment, description will be given taking an example in which the identification number "6" associated with the designation range PA1 is input and the lighting instruments 85 associated with the radiation area PA2 shown in FIG. 8 are turned OFF.

When the user inputs the identification number, the first instrument control unit 622 reads the designation range associated with the input identification number from the first designation range storage unit 642, and causes the first display unit 662 to display it. In the example of FIG. 10, the first instrument control unit 622 reads the designation range PA1, more specifically, the radiation area PA2 associated with the identification number "6", and causes the first display unit 662 to display it. The first display unit 662 may set the display color of the radiation area PA2 to a display color different from the display color of the other radiation areas LA1 to LA4, or may periodically change the display color in a blinking fashion. In another embodiment, the lighting instruments 85 associated with the designation range PA1 may be turned OFF, for example, by proceeding to Step S210 in response to reception of the manipulation of the numeric button BT5 in Step S200 (input of "6" in the example of FIG. 10) and proceeding to Step S230 while skipping Step S220. In this case, Step S220 and the execution button BT4 can be omitted.

Returning to FIG. 9, the first instrument control unit 622 checks in Step S230 whether target instruments associated with the designation range include a different identification information operating instrument. The "different identification information operating instrument" means, in a case of causing target instruments associated with one designation range associated with one piece of identification information to perform one operation, an instrument that is included in the target instruments associated with the one designation range and has already performed another operation different from the one operation by using another piece of identification information different from the one piece of identification information. In the present embodiment, the first instrument control unit 622 checks whether the target instruments to be turned OFF and associated with the designation range PA1 include a lighting instrument 85 that is ON by using identification information different from the input identification number "6". When the different identification information operating instrument is not included (S230: NO), the process proceeds to Step S232. The first instrument control unit 622 turns OFF the lighting instruments 85 associated with the designation range. When the different identification information operating instrument is included (S230: YES), the process proceeds to Step S234. The first instrument control unit 622 turns OFF the lighting instruments 85 other than the different identification information operating instrument. In Step S240, the first instrument control device 81 feeds, back to the main manipulation terminal, information for identifying the turned OFF lighting instruments 85 and information on a manipulation history that the turn-off process has been executed by the first manipulation terminal 100 as a control result in association with a date and time or the like.

In Step S250, the first instrument control unit 622 deletes the designation range PA1 that is the target of the turn-off process and the identification information from the first designation range storage unit 642. Then, the process is completed. In this way, the first instrument control unit 622 deletes the setting information including the designation range PA1 and the identification information when the target instruments associated with the designation range PA1 associated with the identification information have completed the series of operations. The "series of operations" means operations from the start to the completion among the operations performed by the target instruments. In the present embodiment, the period from the start to the completion means a period from ON to OFF for the lighting instruments 85. The "series of operations" also includes manipulations from ON to OFF for the lighting instruments 85, such as adjustment of illuminance of the lighting instruments 85 that have been turned ON.

Figure 11:
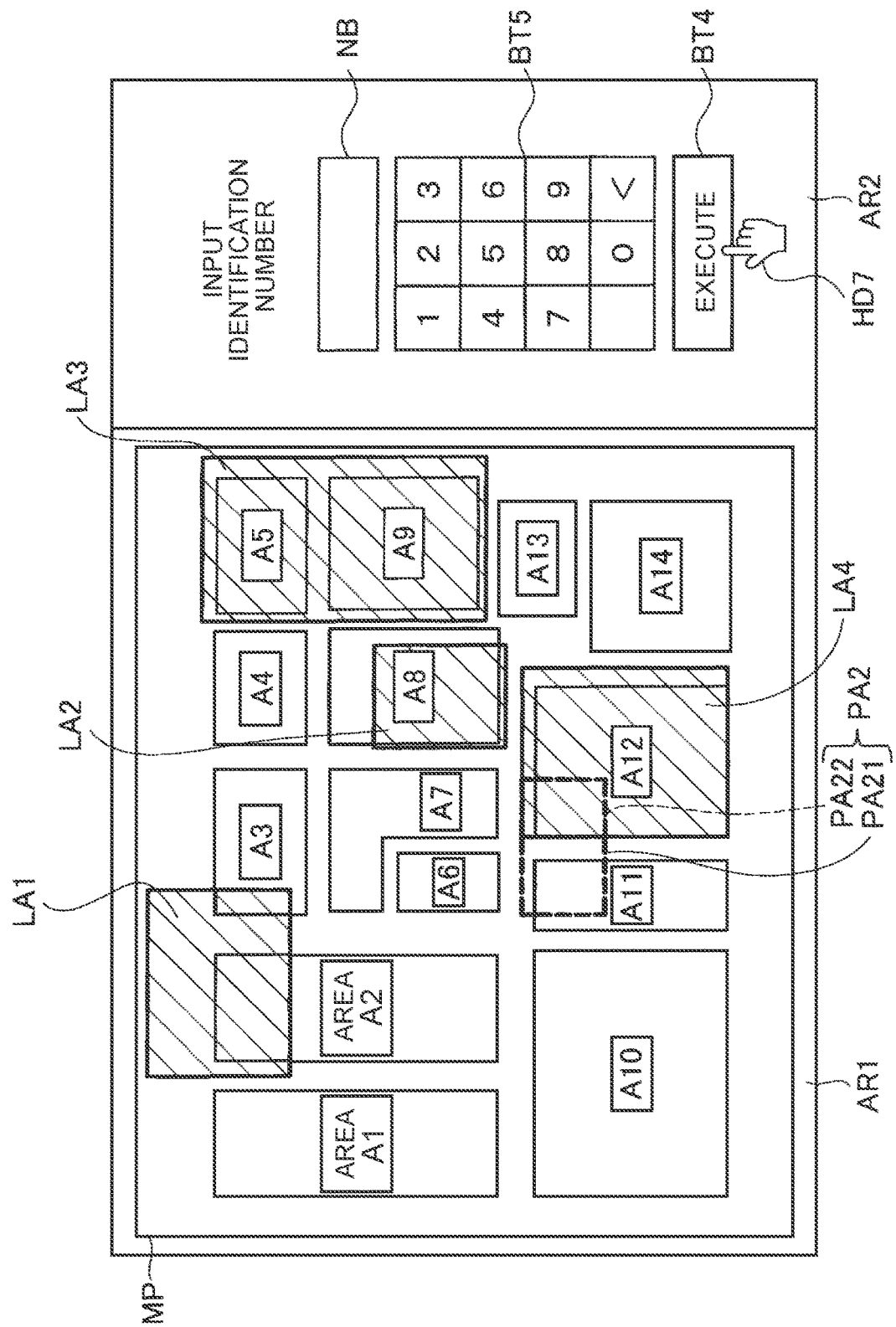
FIG. 11 is an explanatory diagram showing an example of a display screen of the first display unit at the completion of the lighting turn-off process.

FIG. 11 is an explanatory diagram showing an example of a display screen of the first display unit 662 at the completion of the lighting turn-off process for the lighting instruments 85 associated with the designation range. After the identification number is input, the user gives a turn-off instruction for the radiation area PA2 by manipulating the execution button BT4 with a finger HD7. As shown in FIG. 11, the radiation area PA2 includes the radiation area PA22 that overlaps the radiation area LA4 of the different identification information operating instruments, and the radiation area PA21 that does not overlap the radiation area LA4. Therefore, when executing the lighting turn-off process for the target instruments associated with the radiation area PA2, the first instrument control unit 622 turns OFF the lighting instruments 85 associated with the radiation area PA21, excluding the radiation area PA22 that overlaps the radiation area LA4. As a result, the lighting instruments 85 associated with the radiation area PA22 that overlaps the radiation area LA4 remain ON as shown in FIG. 11. The lighting instruments 85 associated with the radiation area PA22 can be turned OFF by a terminal device that has executed turn-on control on the radiation area PA22 with the identification number used when the turn-on operation has been performed for the radiation area PA22.

Figure 12:
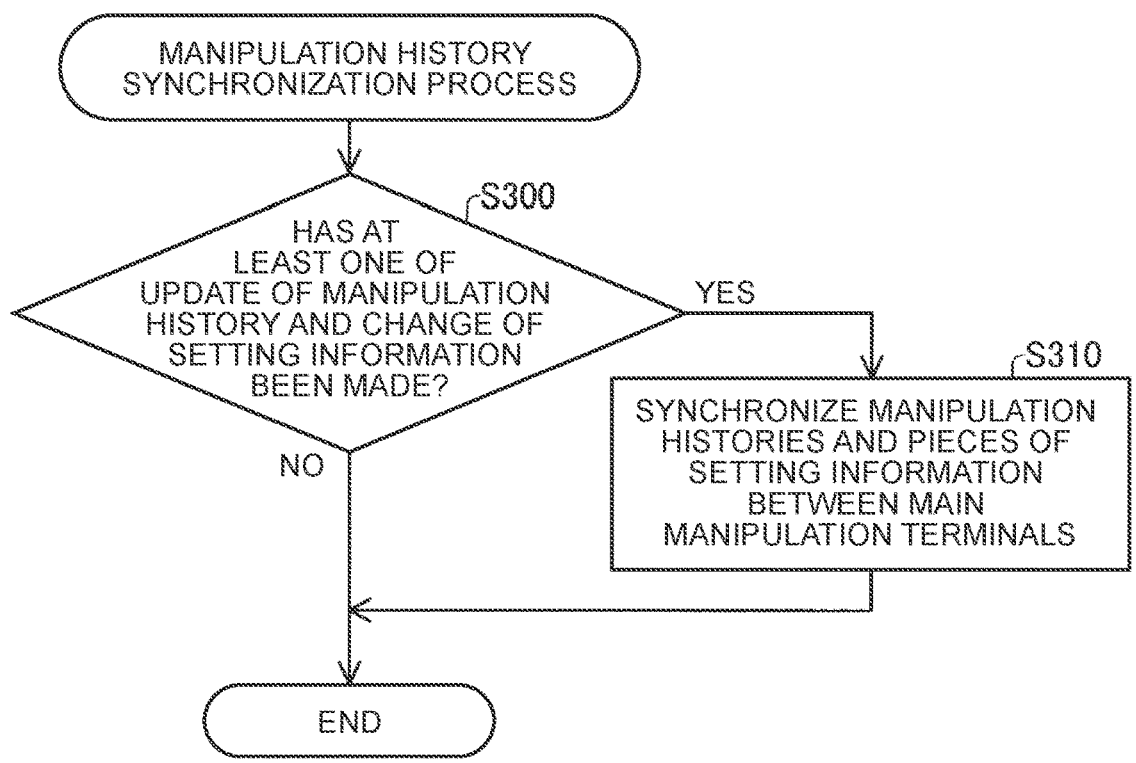
FIG. 12 is a flowchart showing a manipulation history synchronization process to be executed by the main manipulation terminals.

FIG. 12 is a flowchart showing a manipulation history synchronization process to be executed by the main manipulation terminals. The manipulation history synchronization process is executed to maintain the latest and identical state of the manipulation histories and the pieces of setting information including the identification information and the designation range that are stored in the main manipulation terminals. This flow may repeatedly be executed every predetermined unit time, such as every 60 seconds. This flow may be started when the main manipulation terminal receives a command to execute the history synchronization process by a user's action.

In Step S300, the first terminal synchronization unit 624 checks whether at least one of an update of the manipulation history and a change of the setting information has been made. Examples of the case where the setting information is changed include a case where any main manipulation terminal has set a new correspondence between the identification information and the designation range. Examples of the case where the manipulation history is updated include the following two cases. (1) Information on the manipulation history is fed back from the instrument control device to the main manipulation terminal. (2) Any main manipulation terminal executes the lighting turn-on process or the lighting turn-off process.

When neither the update of the manipulation history nor the setting change has been made (S300: NO), the process is terminated. When at least one of the update of the manipulation history and the setting change has been made (S300: YES), the process proceeds to Step S310 to synchronize the main manipulation terminals. Specifically, the first terminal synchronization unit 624 and the second terminal synchronization unit merge and share the manipulation histories and the settings of the designation ranges to obtain the latest state of the manipulation histories of the first instrument manipulation history storage unit 644 and the second instrument manipulation history storage unit and the pieces of setting information of the first designation range storage unit 642 and the second designation range storage unit. As a result, it is possible to maintain the latest manipulation history even if any main manipulation terminal fails to receive feedback from the instrument control device due to a communication failure or the like.

Figure 13:
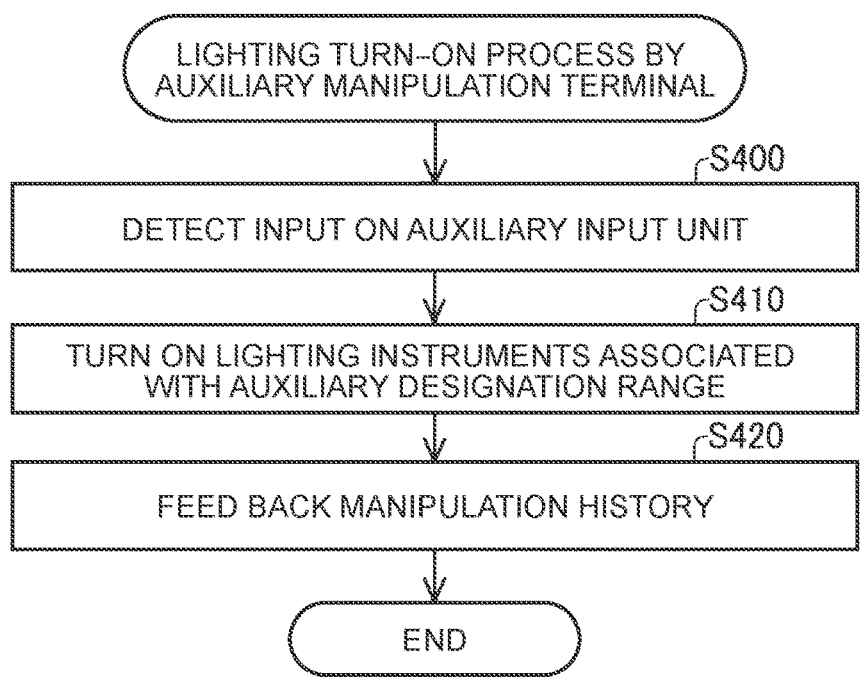
FIG. 13 is a flowchart showing a lighting turn-on process by the auxiliary manipulation terminal.

FIG. 13 is a flowchart showing a lighting turn-on process by the auxiliary manipulation terminal 90. This flow is started, for example, when the user manipulates the auxiliary input unit 92 for the lighting instruments 85 in the OFF state. In Step S400, the auxiliary instrument control unit 942 detects the user's input on the auxiliary input unit 92. In Step S410, the auxiliary instrument control unit 942 reads the auxiliary designation range stored in the auxiliary designation range storage unit 962, and transmits, to the instrument control device, a control signal for turning ON the lighting instruments 85 associated with the auxiliary designation range. The reading of the auxiliary designation range may be omitted, and the auxiliary instrument control unit 942 that has detected the input may transmit a predetermined control signal. The instrument control device that has acquired the control signal from the auxiliary manipulation terminal 90 turns ON the lighting instruments 85 associated with the auxiliary designation range. In Step S420, the instrument control device that has acquired the control signal feeds, back to the main manipulation terminal, information for identifying the turned ON lighting instruments 85 and information on a manipulation history that the turn-on process has been executed by the auxiliary manipulation terminal 90 as a control result in association with a date and time or the like.

Figure 14:
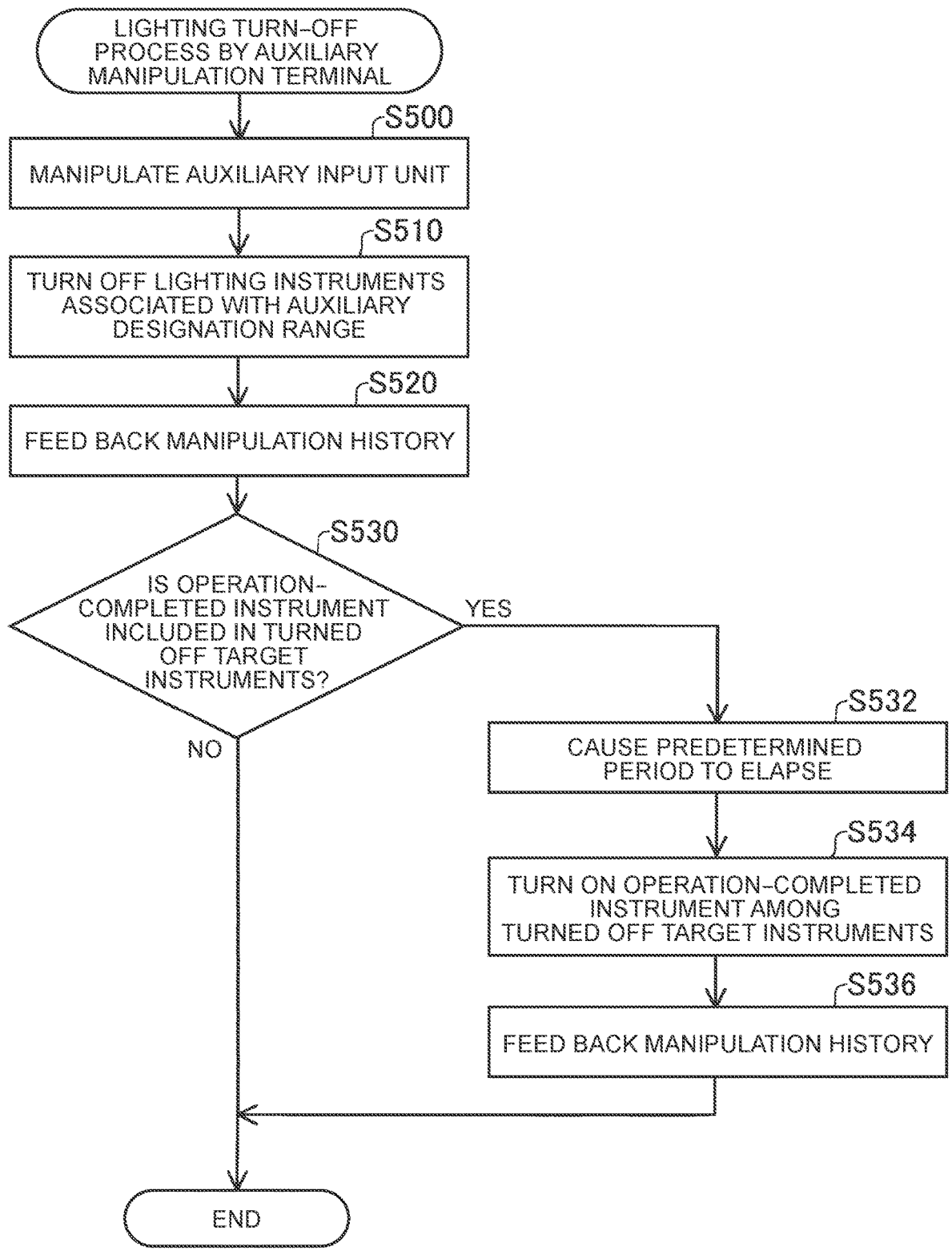
FIG. 14 is a flowchart showing a lighting turn-off process by the auxiliary manipulation terminal.

FIG. 14 is a flowchart showing a lighting turn-off process by the auxiliary manipulation terminal 90. This flow is started, for example, when the user manipulates the auxiliary input unit 92 for the lighting instruments 85 in the ON state. In Step S500, the auxiliary instrument control unit 942 detects the user's input on the auxiliary input unit 92. In Step S510, the auxiliary instrument control unit 942 reads the auxiliary designation range stored in the auxiliary designation range storage unit 962, and transmits, to the instrument control device, a control signal for turning OFF the lighting instruments 85 associated with the auxiliary designation range. The reading of the auxiliary designation range may be omitted, and the auxiliary instrument control unit 942 that has detected the input may transmit a predetermined control signal. The instrument control device that has acquired the control signal from the auxiliary manipulation terminal 90 turns OFF the lighting instruments 85 associated with the auxiliary designation range. When the instrument control device turns OFF the lighting instruments 85 associated with the auxiliary designation range, the instrument control device turns OFF all the lighting instruments 85 associated with the auxiliary designation range regardless of whether the lighting instruments 85 associated with the auxiliary designation range include an operation-completed instrument. The "operation-completed instrument" means, in a case of causing target instruments associated with the auxiliary designation range to perform one operation, an instrument that is included in the target instruments associated with the auxiliary designation range and has already performed another operation different from the one operation by using a manipulation terminal different from the auxiliary manipulation terminal 90. In Step S520, the instrument control device that has acquired the control signal feeds, back to the main manipulation terminal, information for identifying the turned OFF lighting instruments 85 and information on a manipulation history that the turn-off process has been executed by the auxiliary manipulation terminal 90 as a control result in association with a date and time or the like.

In Step S530, the main manipulation terminal, more specifically, each of the first instrument control unit 622 and the second instrument control unit that has received the feedback refers to the manipulation history and checks whether the target instruments turned OFF by the auxiliary manipulation terminal 90 and associated with the auxiliary designation range include the operation-completed instrument. That is, the main manipulation terminal checks whether the lighting instruments 85 turned OFF by the auxiliary instrument control unit 942 in Step S510 include a lighting instrument 85 that has already been turned ON by a manipulation terminal different from the auxiliary manipulation terminal 90. The "manipulation terminal different from the auxiliary manipulation terminal 90" may include not only the first manipulation terminal 100 and the second manipulation terminal 200 but also, in a case where the instrument manipulation system 300 includes a plurality of auxiliary manipulation terminals 90, another auxiliary manipulation terminal 90 different from the auxiliary manipulation terminal 90 that performs the turn-off operation according to this flow. In the present embodiment, description will be given taking an example in which the manipulation terminal that has completed the operation of the operation-completed instrument except the auxiliary manipulation terminal 90 is the first manipulation terminal 100. Steps S532 and S534 are executed by the first manipulation terminal 100 that has confirmed in Step S530 that the manipulation terminal that has completed the operation of the operation-completed instrument is the first manipulation terminal 100.

When the operation-completed instrument is not included (S530: NO), the process is terminated. When the operation-completed instrument is included (S530: YES), the process proceeds to Step S532. The first instrument control unit 622 refers to a time measurement result from a timer (not shown) and waits until a predetermined period elapses, for example, from the timing when the lighting instruments 85 associated with the auxiliary designation range have been turned OFF or the timing when the first manipulation terminal 100 has received the feedback of the manipulation history in Step S520.

In Step S534, the first instrument control unit 622 generates a control signal for turning ON the lighting instrument 85 corresponding to the operation-completed instrument among the turned OFF lighting instruments 85, and transmits the control signal to the instrument control device. The instrument control device turns ON the target lighting instrument 85. The reason why the process proceeds to Step S534 after waiting for the elapse of the predetermined period in Step S532 is that the lighting instrument 85 will be turned ON in Step S534 regardless of the intention of the user who has manipulated the auxiliary manipulation terminal 90. Specifically, when the lighting instrument 85 is turned ON immediately after being turned OFF by the auxiliary manipulation terminal 90 or when the lighting instrument 85 corresponding to the operation-completed instrument is not turned OFF by the auxiliary manipulation terminal 90, the user of the auxiliary manipulation terminal 90 may determine that the auxiliary manipulation terminal 90 is out of order. In Step S536, the instrument control device that has acquired the control signal feeds, back to the main manipulation terminal, information for identifying the turned ON lighting instrument 85 and information on a manipulation history that the turn-on process has been executed by the first manipulation terminal 100 as a control result. Then, the process is terminated.

As described above, according to the instrument manipulation system 300 of the present embodiment, the first manipulation terminal 100 includes: the first display unit 662 configured to display the radiation area PA2 of the lighting instruments 85 in the factory in association with the map of the factory; the first designation range input unit 664 configured to receive the input of the designation range PA1 for designating the lighting instruments 85 to be manipulated within the range associated with the map of the factory; the first identification information input unit 666 configured to receive the input of the identification information set in the designation range PA1; the first designation range storage unit 642 configured to store the designation range PA1 and the identification information in association with each other; and the first instrument control unit 622 configured to turn ON or OFF the lighting instruments 85 associated with the designation range PA1 associated with the input identification information. By storing the designation range of the lighting instruments 85 to be manipulated in association with the identification information, the turn-on process or the turn-off process can be executed by selecting the lighting instruments 85 in the same designation range by the simple method using the identification information. Thus, the convenience of the instrument manipulation system 300 can be improved.

According to the instrument manipulation system 300 of the present embodiment, when the target instruments associated with the designation range PA1 associated with the identification information are to be turned OFF and the different identification information operating instrument in the ON state is included, the first instrument control unit 622 turns OFF the target instruments other than the different identification information operating instrument. Thus, it is possible to reduce the occurrence of the case where the user of the target instruments turns OFF the different identification information operating instrument that has been turned ON by another user or by using other identification information.

The instrument manipulation system 300 of the present embodiment further includes the second manipulation terminal 200 similar to the first manipulation terminal 100. By providing the plurality of main manipulation terminals, even if one main manipulation terminal malfunctions, fails in communication, or the like, the other main manipulation terminal can be used to manipulate the lighting instruments 85 and grasp the manipulation history.

According to the instrument manipulation system 300 of the present embodiment, the second manipulation terminal 200 further includes the second instrument manipulation history storage unit configured to store the manipulation history of the lighting instruments 85 manipulated by the manipulation terminal. The first manipulation terminal 100 further includes: the first instrument manipulation history storage unit 644 configured to store the manipulation history of the lighting instruments 85 manipulated by the manipulation terminal; and the first terminal synchronization unit 624 configured to acquire the manipulation history of the lighting instruments 85 that is stored in the second manipulation terminal 200 and synchronize the acquired manipulation history with the manipulation history stored in the first instrument manipulation history storage unit 644. In the case where the instrument manipulation system 300 includes the plurality of main manipulation terminals, the manipulation histories can be maintained in the latest state by synchronizing the manipulation histories. As a result, it is possible to complement the latest manipulation history between the main manipulation terminals even if any main manipulation terminal fails to receive the feedback from the instrument control device due to a communication failure or the like.

The instrument manipulation system 300 of the present embodiment further includes: the first instrument control device 81 including a first range history storage unit configured to store the manipulation history of the lighting instruments 85 included in the first range T1 among the plurality of lighting instruments 85; and the second instrument control device 82 including a second range history storage unit configured to store the manipulation history of the lighting instruments 85 included in the second range T2. Thus, it is possible to hedge the risk due to malfunction of the instrument control device and communication failure compared with a case where the manipulation history of all the lighting instruments 85 is stored in one instrument control device.

The instrument manipulation system 300 of the present embodiment further includes the auxiliary manipulation terminal 90 configured to turn ON or OFF the lighting instruments 85 associated with the auxiliary designation range. The auxiliary designation range is not set or changed by the auxiliary manipulation terminal 90. When the lighting instruments 85 associated with the auxiliary designation range are to be turned OFF and the operation-completed instrument that has already been turned ON by using a manipulation terminal different from the auxiliary manipulation terminal 90 is included, the auxiliary manipulation terminal 90 turns OFF the lighting instruments 85 including the operation-completed instrument. According to the instrument manipulation system 300 of the present embodiment, the series of operations in the auxiliary designation range can be performed by using the auxiliary manipulation terminal 90 having the simple configuration in which the manipulation targets are fixed within the auxiliary designation range. Since the auxiliary manipulation terminal 90 can execute the operation with priority even when the operation-completed instrument is included in the manipulation targets, the user who acts mainly in the auxiliary designation range or the manager of the auxiliary designation range can be provided with a suitable manipulation terminal.

According to the instrument manipulation system 300 of the present embodiment, when the auxiliary manipulation terminal 90 turns OFF the lighting instruments 85 including the operation-completed instrument, the turned OFF operation-completed instrument is returned to the ON state after the predetermined period has elapsed. When the auxiliary manipulation terminal 90 is set so as not to turn OFF the operation-completed instrument, the user of the auxiliary manipulation terminal 90 may be concerned with the possibility of, for example, malfunction of the auxiliary manipulation terminal 90. By turning OFF the operation-completed instrument once with the auxiliary manipulation terminal 90, it is possible to avoid the concern and to reduce the occurrence of the case where the operation-completed instrument is turned OFF by the user of the auxiliary manipulation terminal 90 regardless of the intention of the user who has turned ON the operation-completed instrument.

According to the instrument manipulation system 300 of the present embodiment, the setting information including the designation range PA1 and the identification information stored in the first designation range storage unit 642 is set to be deleted when the series of operations of the lighting instruments 85 associated with the designation range PA1 associated with the identification information is completed. By resetting the setting information each time the series of operations is completed, the first storage device 64 can be simplified. It is possible to provide the first manipulation terminal 100 with suitable settings for the user who may change the designation range as appropriate. It is possible to clearly distinguish the functions of the main manipulation terminal that changes the designation range as appropriate and the functions of the auxiliary manipulation terminal 90 that can repeatedly perform manipulation for the auxiliary designation range that has been set once.

(B) Other Embodiments (B1) The first embodiment is directed to the example in which the instrument manipulation system 300 includes the first manipulation terminal 100 and the second manipulation terminal 200 as the main manipulation terminals. The instrument manipulation system 300 may include either one of the main manipulation terminals as in a case where only the first manipulation terminal 100 is provided without the second manipulation terminal 200. The instrument manipulation system 300 may include only the main manipulation terminals without the auxiliary manipulation terminal 90.

(B2) The first embodiment is directed to the example in which the manipulation targets of the manipulation terminal are the lighting instruments 85. The manipulation targets are not limited to the lighting instruments 85. Instead of or together with the lighting instruments 85, air conditioning instruments such as blowers, air conditioners, humidifiers, and dehumidifiers may be the manipulation targets. In this case, the "range covered by functions of the air conditioning instruments" is, for example, a range that blown air or the like can reach, or a space where a cooling or heating effect is exerted. The manipulation targets are not limited to the lighting instruments 85 or the air conditioning instruments. The manipulation targets may be, for example, pumps, valves, instruments that operate fluid supply or discharge, or security, crime prevention, or monitoring instruments that can control door opening or closing, room accessibility, key locking, or monitoring camera manipulation. The manipulation targets may be various instruments to be turned ON or OFF, such as transport instruments typified by elevators and conveyors, communication instruments, or electrical instruments whose power supply can be manipulated. In this case, the range covered by functions is, for example, a space where fluid is supplied or discharged, a room or space where security is provided by key locking or the like, a transport area, a communication area, or a power supply area.

(B3) The first embodiment is directed to the example in which the identification information input by the first identification information input unit 666 is the one-digit identification number. The identification information is not limited to the identification number. The identification information may be various types of information that can identify individuals, such as text information that is a combination of letters such as alphanumerics, authentication information of the main manipulation terminal, an action pattern on the first display unit 662 serving as the touch panel, or the user's name, employee identification card, facial authentication, or fingerprint authentication. A radio frequency (RF) tag to be used for a radio frequency identifier (RFID) and a near field communication (NFC) tag and an integrated circuit (IC) chip to be used for NFC may also be used. The RF tag may also be referred to as "electronic tag", "IC tag", "wireless tag", or "RFID tag".

(B4) The first embodiment is directed to the example in which both the first designation range input unit 664 and the first identification information input unit 666 use the touch sensor of the first touch panel 66. The first designation range input unit 664 and the first identification information input unit 666 may be input units other than the touch sensor. The first designation range input unit 664 and the first identification information input unit 666 may be different input units. The first embodiment is directed to the example in which the identification information is input by using the touch sensor of the first display unit 662. The method for inputting the identification information is not limited to this method. In a case where the identification information is obtained by, for example, facial authentication or fingerprint authentication, a camera or sensor for authenticating the face or fingerprint functions as the first identification information input unit. In a case where an RF tag or the like is used, the first identification information input unit may employ an RF reader capable of acquiring information assigned to the RF tag. The RF reader includes various devices capable of detecting the RF tag, such as an RF reader/writer or an RF scanner.

(B5) In the first embodiment, the first terminal synchronization unit 624 merges and synchronizes the manipulation history and the setting information including the identification information and the designation range that are stored in the other main manipulation terminal, but may synchronize only the manipulation history.

(B6) The first embodiment is directed to the example in which the user of the first manipulation terminal 100 is the person who is unfamiliar with the factory, the user of the second manipulation terminal 200 is the person who is familiar with the factory, and the user of the auxiliary manipulation terminal 90 is the person who acts mainly in the predetermined range in the factory. The users of the manipulation terminals are not limited to these persons, and may be any persons.

(B7) The first embodiment is directed to the example in which the setting information including the designation range PA1 and the identification information stored in the first designation range storage unit 642 is deleted when the series of operations of the lighting instruments 85 associated with the designation range PA1 associated with the identification information is completed. The setting information need not be deleted even after the series of operations, but may be retained, for example, until it is deleted in response to a request from the user. According to the instrument manipulation system of this mode, it is possible to improve the convenience when the same operation or a plurality of operations is performed on the same designation range a plurality of times.

(B8) The first embodiment is directed to the example in which the predetermined operations to be performed by the lighting instrument 85 are the operations of turning ON (lighting-up) and turning OFF (extinguishing) the lighting instrument 85. Instead of the operations that uniquely determine the states of the instrument, such as ON and OFF, relative operations depending on current environment may be performed as typified by a case where the illuminance of the lighting instrument 85 is increased and reduced or a case where the temperature of the air conditioning instrument is increased and reduced.

(B9) The first embodiment is directed to the example in which the first display unit 662 displays the plan view MP showing the factory map to display the disposition positions or the like of the lighting instruments 85 in association with the predetermined area. Instead of the plan view MP, the first display unit 662 may display text information such as step names and instrument names.

The present disclosure is not limited to each of the above embodiments, and can be realized by various configurations without departing from the spirit thereof. For example, the technical features in each embodiment corresponding to the technical features in each aspect can be replaced or combined as appropriate in order to solve some or all of the above issues or achieve some or all of the above effects. When the technical features are not described as being essential herein, these features can be deleted as appropriate.

What is claimed is:

1. An instrument manipulation system comprising:
   instruments disposed in a predetermined area; and
   a first manipulation terminal,
   wherein the first manipulation terminal comprises:

a first display unit configured to display, in association with the predetermined area, at least one of disposition positions of the instruments in the predetermined area and a range covered by functions of the instruments;

a first designation range input unit configured to receive an input of a designation range for designating at least one target instrument to be manipulated among the instruments within a range associated with the predetermined area;

a first identification information input unit configured to receive an input of identification information set in the designation range;

a first designation range storage unit configured to store the designation range and the identification information in association with each other; and a first instrument control unit configured to cause the target instrument associated with the designation range associated with the input identification information to perform a predetermined operation.

2. The instrument manipulation system according to claim 1, wherein the first instrument control unit is configured to, when the target instrument associated with the designation range associated with the input identification information is to be caused to perform the operation and a different identification information operating instrument that has performed a different operation from the operation by using different identification information from the input identification information is included, cause the target instrument excluding the different identification information operating instrument to perform the operation.

3. The instrument manipulation system according to claim 1, further comprising a second manipulation terminal that includes:

a second display unit configured to display, in association with the predetermined area, at least one of the disposition positions of the instruments in the predetermined area and the range covered by the functions of the instruments;

a second designation range input unit configured to receive an input of the designation range;

a second identification information input unit configured to receive an input of the identification information;

a second designation range storage unit configured to store the designation range and the identification information in association with each other; and a second instrument control unit configured to cause the target instrument associated with the designation range associated with the input identification information to perform at least one predetermined operation.

4. The instrument manipulation system according to claim 3, wherein:

the second manipulation terminal further includes a second instrument manipulation history storage unit configured to store a manipulation history of the instruments manipulated by a manipulation terminal; and the first manipulation terminal further comprises:

a first instrument manipulation history storage unit configured to store the manipulation history for the manipulation terminal; and a first terminal synchronization unit configured to acquire the manipulation history stored in the second manipulation terminal and synchronize the acquired manipulation history with the manipulation history stored in the first instrument manipulation history storage unit.

5. The instrument manipulation system according to claim 1, further comprising:

a first instrument control device including a first range history storage unit configured to store a manipulation history of at least one instrument included in a predetermined first range among the instruments; and a second instrument control device different from the first instrument control device and including a second range history storage unit configured to store a manipulation history of at least one instrument included in a predetermined second range different from the first range among the instruments.

6. The instrument manipulation system according to claim 1, further comprising an auxiliary manipulation terminal configured to cause, among the instruments, at least one target instrument associated with an auxiliary designation range for designating the target instrument to perform the operation, wherein:

the auxiliary designation range is not changed by the auxiliary manipulation terminal; and the auxiliary manipulation terminal is configured to, when the target instrument associated with the auxiliary designation range is to be caused to perform the operation and an operation-completed instrument that has already performed a different operation from the operation by using a different manipulation terminal from the auxiliary manipulation terminal is included, cause the target instrument including the operation-completed instrument to perform the operation.

7. The instrument manipulation system according to claim 6, wherein the first instrument control unit is configured to, after a predetermined period has elapsed since the auxiliary manipulation terminal caused the target instrument including the operation-completed instrument to perform the operation, return the operation-completed instrument that has performed the operation to a state before the operation is performed.

8. The instrument manipulation system according to claim 1, wherein the first instrument control unit is configured to, when a series of the operations of the target instrument associated with the designation range associated with the stored identification information is completed, delete the designation range and the identification information stored in the first designation range storage unit.

9. A manipulation terminal comprising:

a display unit configured to display, in association with a predetermined area, at least one of disposition positions of instruments disposed in the predetermined area and a range covered by functions of the instruments;

a designation range input unit configured to receive an input of a designation range for designating a target instrument to be manipulated among the instruments within a range associated with the predetermined area;

an identification information input unit configured to receive an input of identification information set in the designation range;

a designation range storage unit configured to store the designation range and the identification information in association with each other; and an instrument control unit configured to cause the target instrument associated with the designation range associated with the input identification information to perform at least one predetermined operation.

* * * * *